UNITED STATES PATENT OFFICE 2,367,989

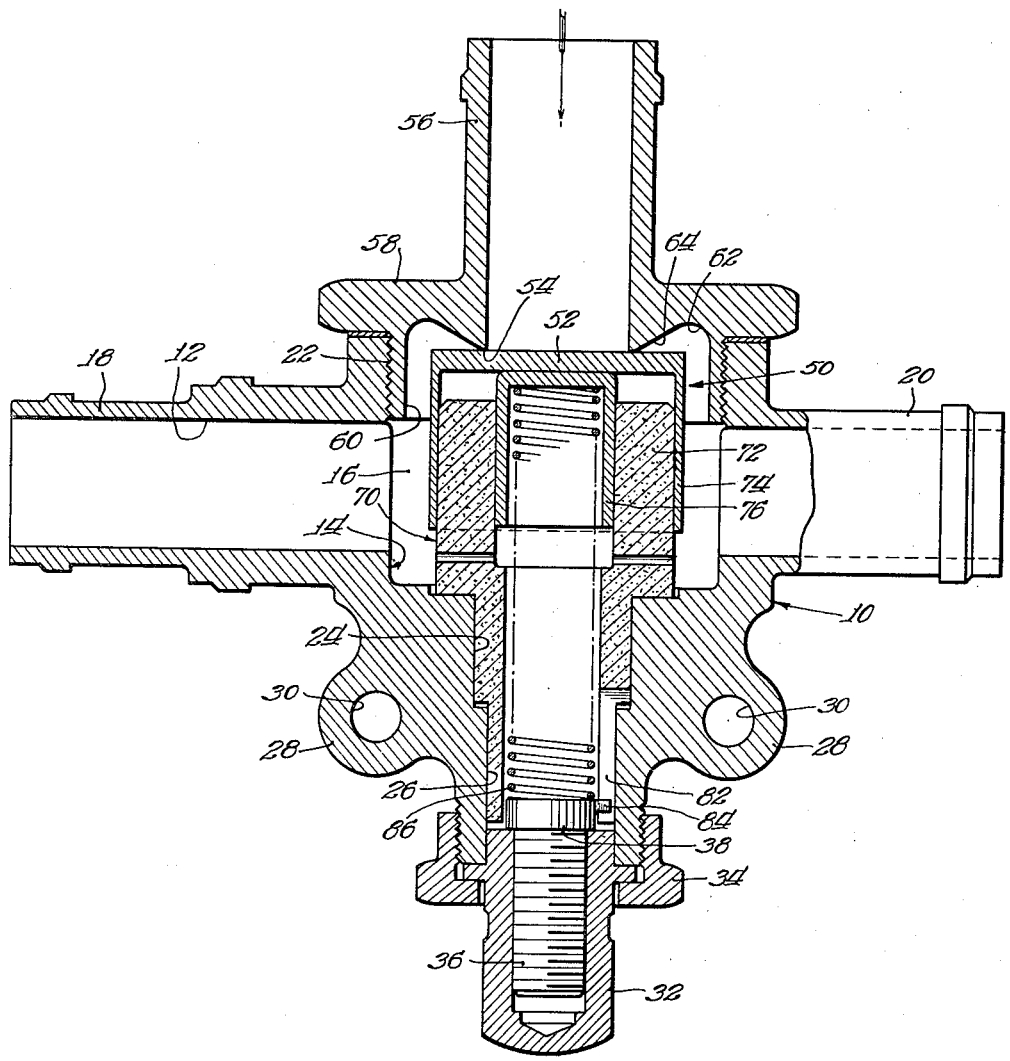

SUCTION RELIEF VALVE

William H. Alders, Youngstown, Ohio, assignor to Pesco Products Co., a corporation of Ohio Application September 17, 1943, Serial No. 502,785

1 Claim. (Cl. 251—146)

This invention relates to relief valves and particularly to a valve of this class having special application on an aircraft in the suction line between the various instruments and the vacuum pump for maintaining a substantially constant value of suction irrespective of varying pump speeds.

It is the object of the present invention to provide an improved relief valve arrangement of the type which is light in weight, compact and simple of construction and which embodies a special combination of features including a unitary supporting guide and dash pot assembly rendering the relief valve more efficient both in operation and maintenance.

It is a more specific object to provide in a valve of the present class an improved construction of valve proper in cooperation with an improved construction of valve seat and surrounding valve chamber as well as improved support and guide for the valve proper incorporating a dash pot action whereby to render the complete assembly more responsive to slight changes in the variables acting thereon and thus maintain a more closely constant predetermined value of vacuum on the associated instruments notwithstanding fluctuation in the variables including particularly fluctuations in the speed of rotation of the vacuum pump.

The above and other objects, advantages and uses of my invention will become apparent from a reading of the following specification taken in connection with the appended drawing which forms a part thereof and wherein the single figure is an elevational view in cross section of a vacuum relief valve assembly incorporating a preferred embodiment of my invention.

Referring in greater detail to the relief valve assembly shown on the drawing, by way of preferred example the same includes a valve housing 10 formed with a pair of bores 12 and 14 intersecting to define a valve receiving chamber 16. The housing proturberances incorporating the opposite terminals of bore 12 may be extended to form adaptors 18 and 20 for connection in the vacuum line of an aircraft (not shown).

Intersecting bore 14 has a relatively large threaded terminal 22 on one side of valve chamber 16 and a succession of stepped down or reduced cylindrical portions 24 and 26 on the other side of valve chamber 16. The housing 10 is provided with protuberant flanges 28 having openings 30 therethrough adapted to be used in mounting the valve housing on an associated aircraft. The terminal of the housing about reduced bore 26 is threaded for the reception of a lock nut and adjusting screw assembly which may include an adjusting nut 32 received in the end of bore 26, a lock nut 34 embracing the adjusting nut and arranged to clamp the same in any selected position and finally a screw 36 insertably received in the head of the adjusting nut and having a flanged end 38 for engagement with a coil compression spring to adjust the compression thereof, as will appear.

My invention is particularly directed to an improved valve assembly proper, valve seat and surrounding structure, guide and support for the valve proper for maintaining axial alignment and incorporating a dash pot action, this novel arrangement being indicated generally at 50. A flat disc-like valve 52 cooperates with a valve seat 54 provided at the inner terminal end of the converging air inlet conduit 56. It is important to note that valve seat 54 has a considerably smaller diameter than the cooperating disc-like valve 52, the latter overlapping the valve seat by an appreciable amount. The diameter of the valve 52 is preferably about twice that of valve seat 54. Valve seat 54 forms part of closure plug 58 adapted to be received threadably in the large threaded terminal 22 of bore 14. This closure plug is formed with an enlarged bore 60 surrounding and spaced from the periphery of disc-like valve 52. A smooth curve 62 joins bore 60 with a conically shaped surface 64 terminating in valve seat 54.

The significance of this particular structural relationship will be appreciated from an understanding of the fact that the pressure and velocity vary inversely, the product of the two being the same throughout a given stream. Therefore by providing a relatively narrow edged valve seat 54 and recessing the valve chamber about the seat 54 and otherwise recessing the valve chamber about the periphery of valve 52 the velocity of the air entering between valve seat 54 and valve 52 is maintained at as low a value as possible and hence the pressure effect of air tending to maintain valve 52 open is raised to the highest available value. In addition by having disc-like valve 52 overlap valve seat 54 by an appreciable amount as well as having valve 52 present a relatively sharp outer radial extremity this pressure effect tending to help maintain valve 52 open is enhanced.

For the purpose of effectively mounting valve 52, guiding the same in accurate axial alignment with respect to valve seat 54, maintaining the requisite lubrication of the surfaces subject to friction and finally for the purpose of incorporating the requisite dash pot action to prevent irregular movement of the valve, I provide a novel unitary arrangement of structure that may be readily fabricated, aligned and otherwise placed in condition for operation outside the valve housing and inserted therein as a single assembly. This arrangement includes a tubular guide and valve support indicated generally at 70 composed preferably of graphite to provide the necessary lubrication and comprising a piston-like portion 72 received between a pair of depending relatively thin concentric tubular walls 74, 76 extending from the back face of valve 52, said tubular guide and support also having successively reduced cylindrical portions for cooperation with the reduced cylindrical bores 24 and 26. Tubular guide and support 70 is provided with an axially extending slot 82 arranged to cooperate with a protuberance 84 forming part of adjusting screw flange 38 to prevent the same from turning when adjusting nut 32 is operated to vary the compression of compression coil spring 86 one terminal of which is received within inner depending tubular wall 76, the other being engaged by flange 38 of adjusting screw 36. With the above arrangement of structure it is only necessary to machine bore 14 including the reduced bore portions 24 and 26 within a very liberal range of tolerances, as tubular guide and support 70 and the associated depending relatively thin walls 74 and 76 as well as closure plug 58 including the valve seat and surrounding structure can all be machined, aligned and otherwise finished prior to installation in housing 10.

While I have described my invention in connection with a specific embodiment thereof it is to be understood that this is by way of example and not by limitation, and that I intend my invention to be defined by the appended claim.

I claim:

In a vacuum valve arrangement means defining a housing having a valve chamber formed therein, means adapted to place said valve chamber in communication with a vacuum line, means defining a valve seat in communication on one side with the atmosphere and on the other side thereof with said valve chamber, said valve seat defining means being recessed in an axial direction radially outwardly of said seat to reduce the valve seat contact area thereby providing a relatively sharp seating surface, said axially extending recess having a smooth curved contour, means defining a valve for cooperation with said valve seat including a disc-like valve proper, said disc-like valve proper overlapping said seat in the radially outward direction by an appreciable amount, a plurality of depending relatively thin concentric tubular walls extending from the back face of said disc-like valve proper, said walls including a first outer wall defining with the radial outer periphery of said disc-like valve a relatively sharp outer peripheral edge, a third open-ended tubular member preferably of graphite and having a wall of substantial radial thickness received in the space between said depending relatively thin walls and functioning therewith to define a valve guide and dash pot, said third tubular member having successively reduced cylindrical portions received in complimentarily formed successively reduced bores in said housing for positioning and supporting the same, a coil compression spring received within said third tubular member with the inner terminal portion thereof functioning to urge said valve in the direction of engagement with said seat and adjustable means engaging the outer terminal of said spring for varying the compression thereof.

WILLIAM H. ALDERS.